(12) United States Patent
Suzuki et al.

(10) Patent No.: US 8,718,723 B2
(45) Date of Patent: May 6, 2014

(54) DEVICE HOUSING, MOBILE TERMINAL DEVICE, AND METHOD THEREFOR

(75) Inventors: Takashi Suzuki, Kawasaki (JP); Hidekatsu Kobayashi, Kawasaki (JP); Ryo Hattori, Kawasaki (JP); Kouki Murakami, Kawasaki (JP); Hidehiko Hizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 12/609,351

(22) Filed: Oct. 30, 2009

(65) Prior Publication Data
US 2010/0134963 A1 Jun. 3, 2010

(30) Foreign Application Priority Data

Nov. 28, 2008 (JP) .................................. 2008-305601

(51) Int. Cl.
*H04M 1/00* (2006.01)
(52) U.S. Cl.
USPC ...................................... 455/575.3; 455/550.1
(58) Field of Classification Search
USPC ............................................ 455/575.1, 575.3
See application file for complete search history.

(56) References Cited

U.S. PATENT DOCUMENTS

| | | | |
|---|---|---|---|
| 2001/0034242 A1* | 10/2001 | Takagi | 455/550 |
| 2005/0285991 A1* | 12/2005 | Yamazaki | 349/58 |
| 2006/0258325 A1* | 11/2006 | Tsutaichi et al. | 455/350 |
| 2009/0005132 A1 | 1/2009 | Ogatsu | |
| 2009/0291709 A1 | 11/2009 | Lee et al. | |

FOREIGN PATENT DOCUMENTS

| | | |
|---|---|---|
| CN | 101091174 | 12/2007 |
| CN | 101103323 | 1/2008 |
| JP | 9-214144 | 8/1997 |
| JP | 2003-170531 | 6/2003 |
| JP | 2006-11163 | 1/2006 |

OTHER PUBLICATIONS

Chinese Office Action mailed Apr. 6, 2012, for corresponding Chinese Patent Application No. 200910225099.4.
Japanese Office Action dated May 8, 2012 issued in corresponding Japanese Patent Application No. 2008-305601.
Chinese Office Action mailed Sep. 27, 2013 in corresponding Chinese Application No. 200910225099.4.

* cited by examiner

*Primary Examiner* — Michael Faragalla
(74) *Attorney, Agent, or Firm* — Staas & Halsey LLP (57) ABSTRACT

There is provided a device housing for a mobile terminal device that includes a metallic plate, an external wall formed of resin and disposed at outer peripheral edges of the metallic plate, an electronic component holder formed of the resin at the nearly same time when the external wall is formed. Furthermore, the electronic component holder disposed on an inner area of the metallic plate surrounded by the external wall the metallic plate and disposed apart from the external wall.

6 Claims, 8 Drawing Sheets

DEVICE HOUSING, MOBILE TERMINAL DEVICE, AND METHOD THEREFOR

CROSS-REFERENCE TO RELATED APPLICATIONS

This application is based upon and claims the benefit of priority of the prior Japanese Patent Application No. 2008-305601, filed on Nov. 28, 2008, the entire contents of which are incorporated herein by reference.

FIELD

The embodiments discussed herein are related to a device housing and a mobile terminal device.

BACKGROUND

Hitherto, it is widely known that a mobile terminal device such as a cellular phone includes a device housing with a metallic plate integrally formed with resin to reduce size and increase strength at the same time. Such a mobile terminal device including a device housing of this type is applied to, for example, a personal computer, and is disclosed in, for example, Japanese Laid-open Patent Publication No. 9-214144.

Recent mobile terminal devices are required to be waterproof in addition to being small and having a high strength. Accordingly, as a waterproof structure of a device housing, the following structure is generally used in a mobile terminal device such as that described above. That is, in the structure, an external wall is integrally formed with resin along outer peripheral edges of a metallic plate. Thereafter a waterproof tape is adhered to an inner area of the metallic plate surrounded by the external wall. Then other members such as a panel member are adhered and secured to the metallic plate through the waterproof tape. In addition, an area situated inwardly of the waterproof tape provides space for disposing an electronic component holder for holding various electronic components such as a liquid crystal display (LCD).

Here, from the viewpoint of providing adhesive strength by the waterproof tape, a flat area is required as an area where the waterproof tape is adhered in the inner area of the metallic plate surrounded by the external wall. Therefore, in the above-described device housing, the electronic component holder has been separated from the external wall formed at the outer peripheral edges of the metallic plate, because of providing a flat area as a waterproof adhesion area between the external wall and the electronic holder. In addition, for providing such a waterproof tape adhesion area, the electronic component holder and the metallic plate, where the external wall is formed, are manufactured as separate individual components, and the electronic component holder is attached later to the metallic plate, where the external wall is formed.

SUMMARY

According to an aspect of the invention, a device housing for a mobile terminal device includes a metallic plate, an external wall formed of resin and disposed at outer peripheral edges of the metallic plate, an electronic component holder formed of the resin at the nearly same time when the external wall is formed. Furthermore, the electronic component holder disposed on an inner area of the metallic plate surrounded by the external wall the metallic plate and disposed apart from the external wall.

According to another aspect of the invention, a mobile terminal device includes a device housing. The device housing includes a metallic plate, an external wall formed of resin and disposed at outer peripheral edges of the metallic plate, an electronic component holder formed of the resin at the nearly same time when the external wall is formed. The electronic component holder disposed on an inner area of the metallic plate surrounded by the external wall the metallic plate and disposed apart from the external wall.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A device housing of a mobile terminal device and the mobile terminal device according to preferred embodiments will hereunder be described in detail with reference attached drawings.

Figure 1:
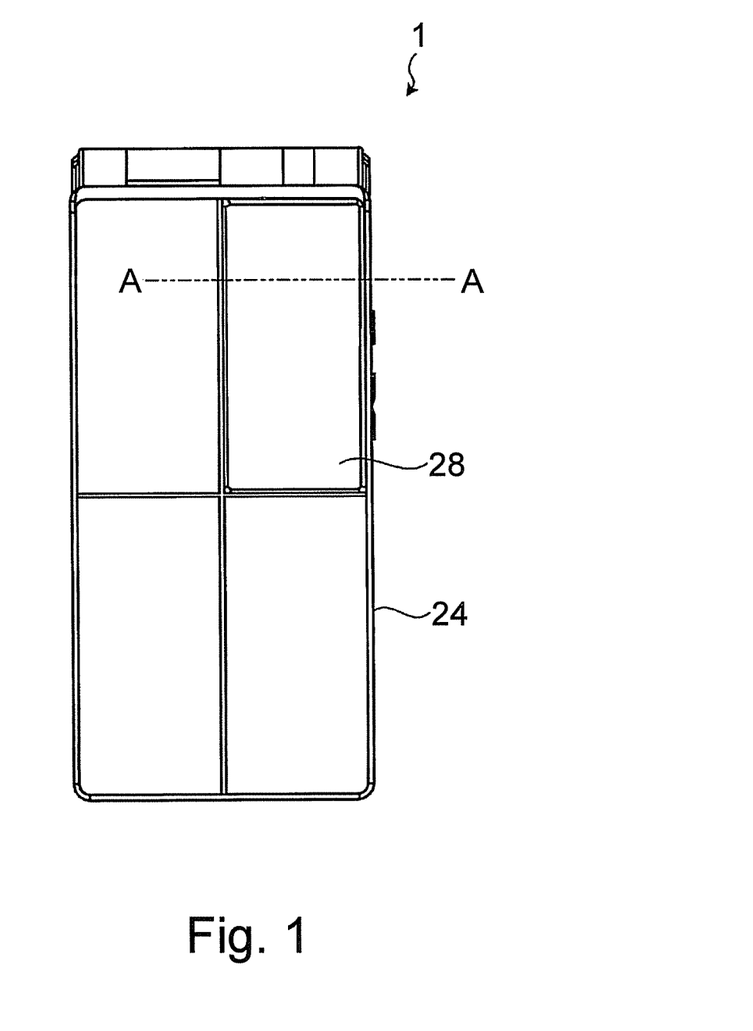
FIG. 1 is a plan view illustrating a state in which a cellular phone according to an embodiment is folded.
Figure 2:
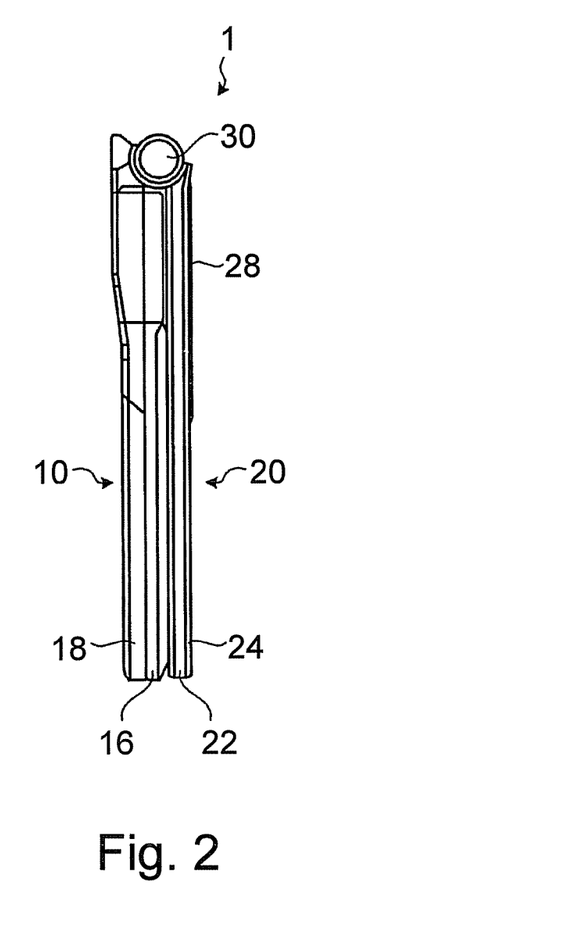
FIG. 2 is a side view of the cellular phone illustrated in FIG. 1.
Figure 3:
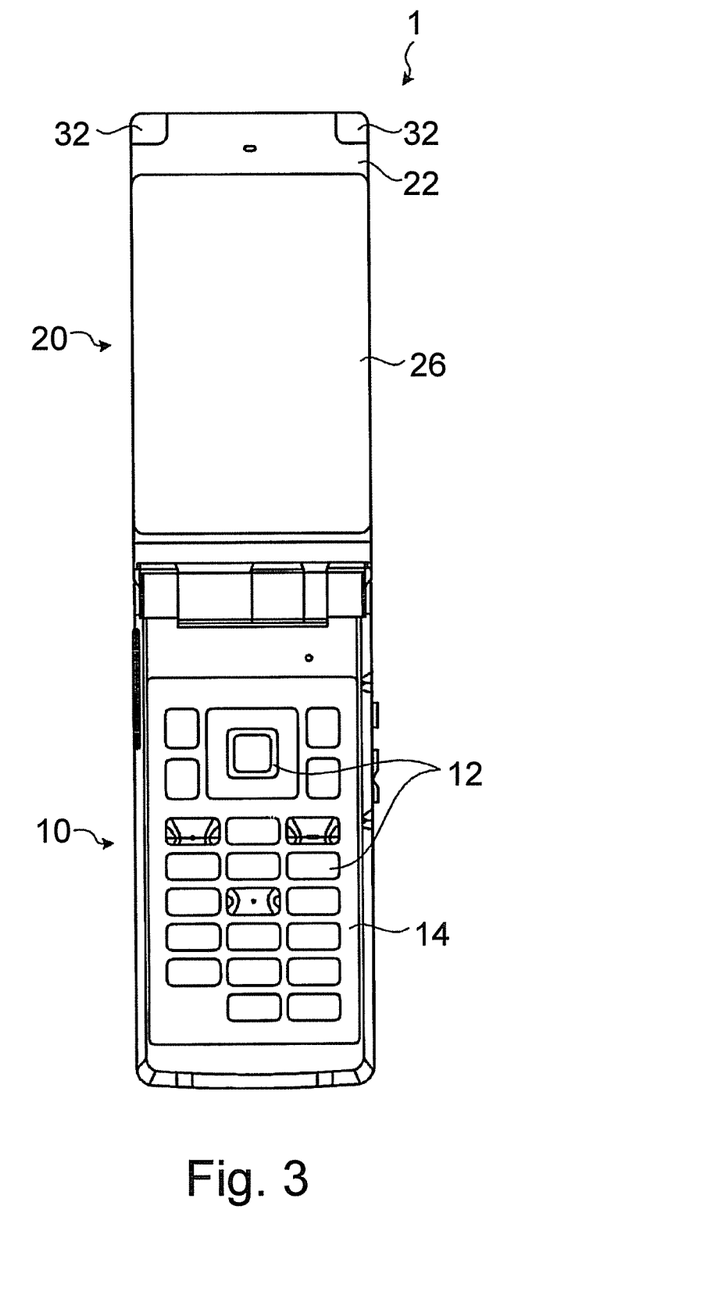
FIG. 3 is a plan view illustrating a state in which the cellular phone illustrated in FIG. 1 is opened.
Figure 4:
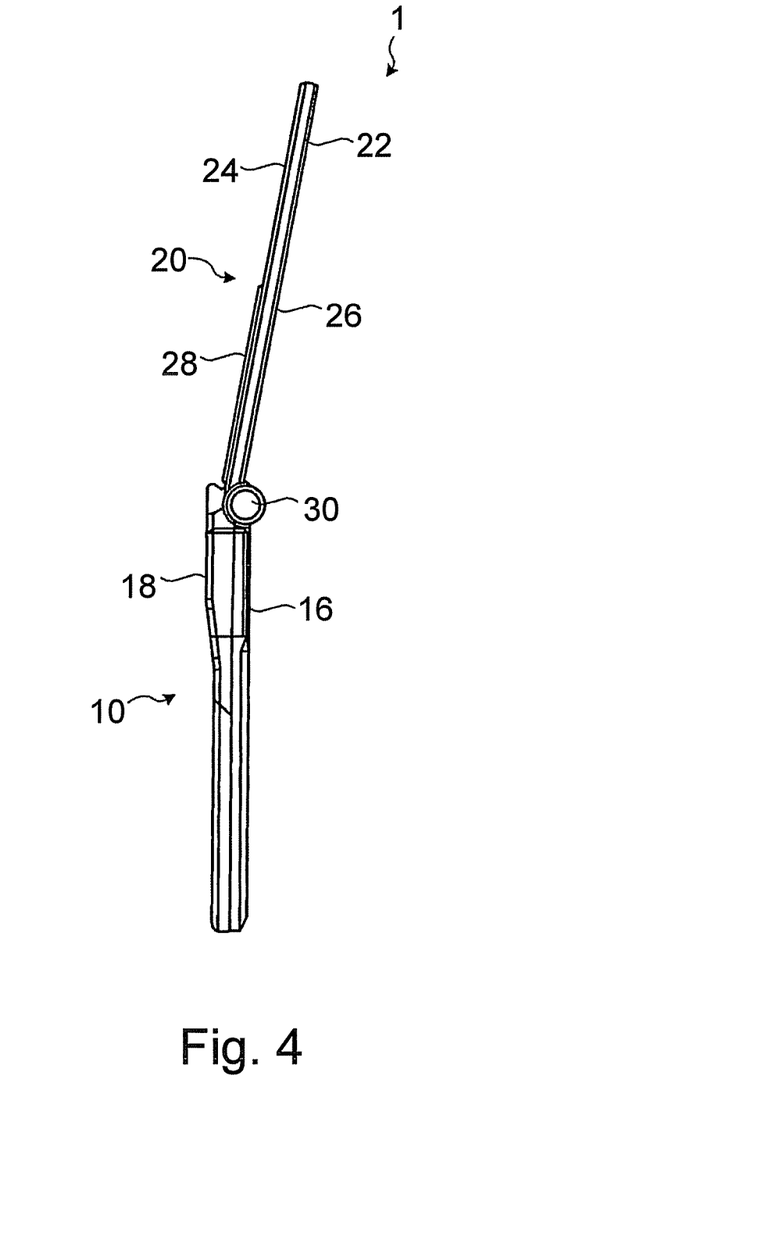
FIG. 4 is a side view of the cellular phone illustrated in FIG. 3.

As the embodiments, a cellular phone and a movable rear case as a movable housing of the cellular phone will be described as exemplary applications to serving as the mobile terminal device and to serving as the device housing of the mobile terminal device respectively. FIG. 1 is a plan view illustrating an appearance of the cellular phone in a state of being folded. FIG. 2 is a side view of the cellular phone depicted in FIG. 1. FIG. 3 is a plan view illustrating a state in which the cellular phone is open. FIG. 4 is a side view of the cellular phone depicted in FIG. 3.

As illustrated in FIGS. 1 to 4, the cellular phone 1 according to the embodiment is formed so that a stationary housing 10 and a movable housing 20 are connected pivotably around a hinge to each other. The stationary housing 10 includes operation keys and the movable housing 20 includes a display.

The stationary housing 10 has a two-division structure. One is a stationary front case 16 which includes an operation panel plate 14 provided with the various operation keys 12 (such as a numeric keypad), and the other is a stationary rear case 18, positioned at the back side of the stationary front case 16. In addition to the various operation keys 12, the stationary front case 16 is provided with, for example, a mouthpiece (not illustrated) including a microphone disposed therein. The stationary front case 16 and the stationary rear case 18 are assembled to each other by securing them with screws (not illustrated) at four corners thereof.

The movable housing 20 also has a two-division structure including a movable front case 22 and a movable rear case 24 disposed at the back side of the movable front case 22. The movable front case 22 includes, for example, a liquid crystal display device 60 (such as a liquid crystal display (LCD) module; see FIG. 7) and a sub-LCD module 62 (see FIG. 6) performing an auxiliary displaying operation. A transparent front LCD panel 26 for viewing the liquid crystal display device 60 is provided at substantially a center portion of a surface of the movable front case 22. A transparent rear LCD panel 28 for viewing the sub-LCD module 62 (see FIG. 6) is provided at a surface of the movable rear case 24. Both of the movable front case 22 and the movable rear case 24 are assembled and secured to each other with mounting screws (not illustrated) at four corners thereof. In addition, screw covers 32 are provided at positions on the top portion of the front LCD panel 26.

Figure 5:
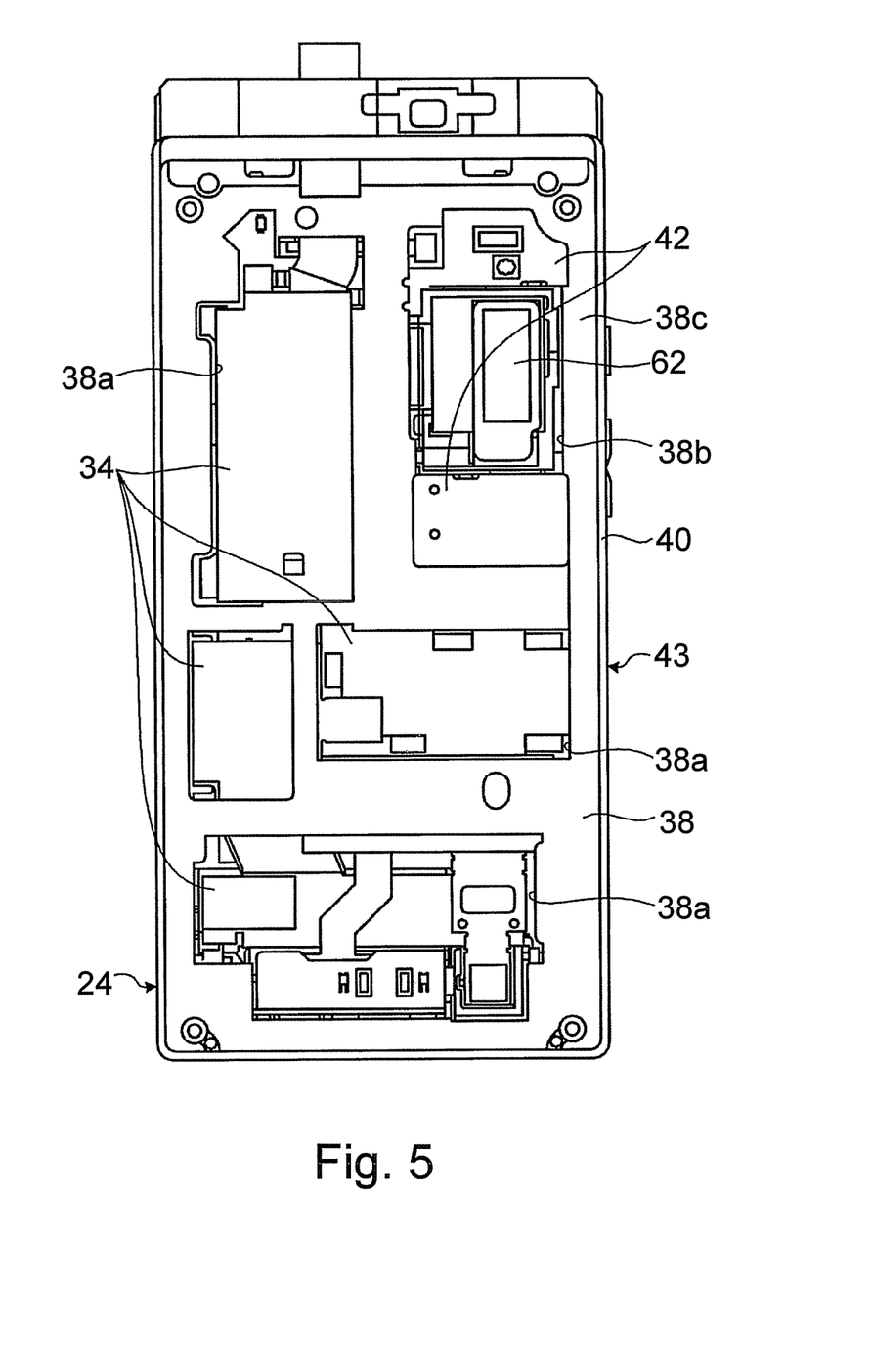
FIG. 5 is a plan view of the interior of a movable rear case of a movable housing.
Figure 6:
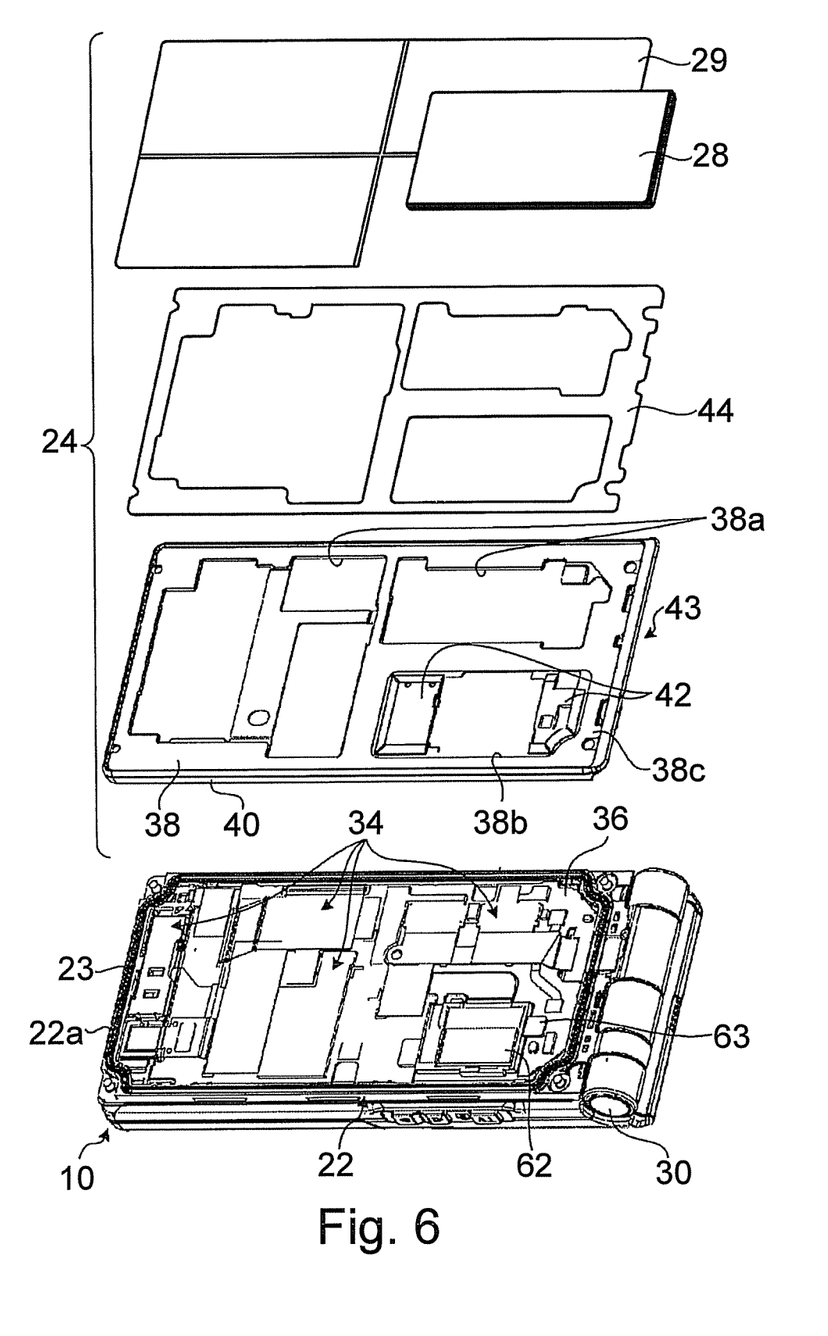
FIG. 6 is an exploded perspective view of the interior of the movable rear case of the movable housing.
Figure 7:
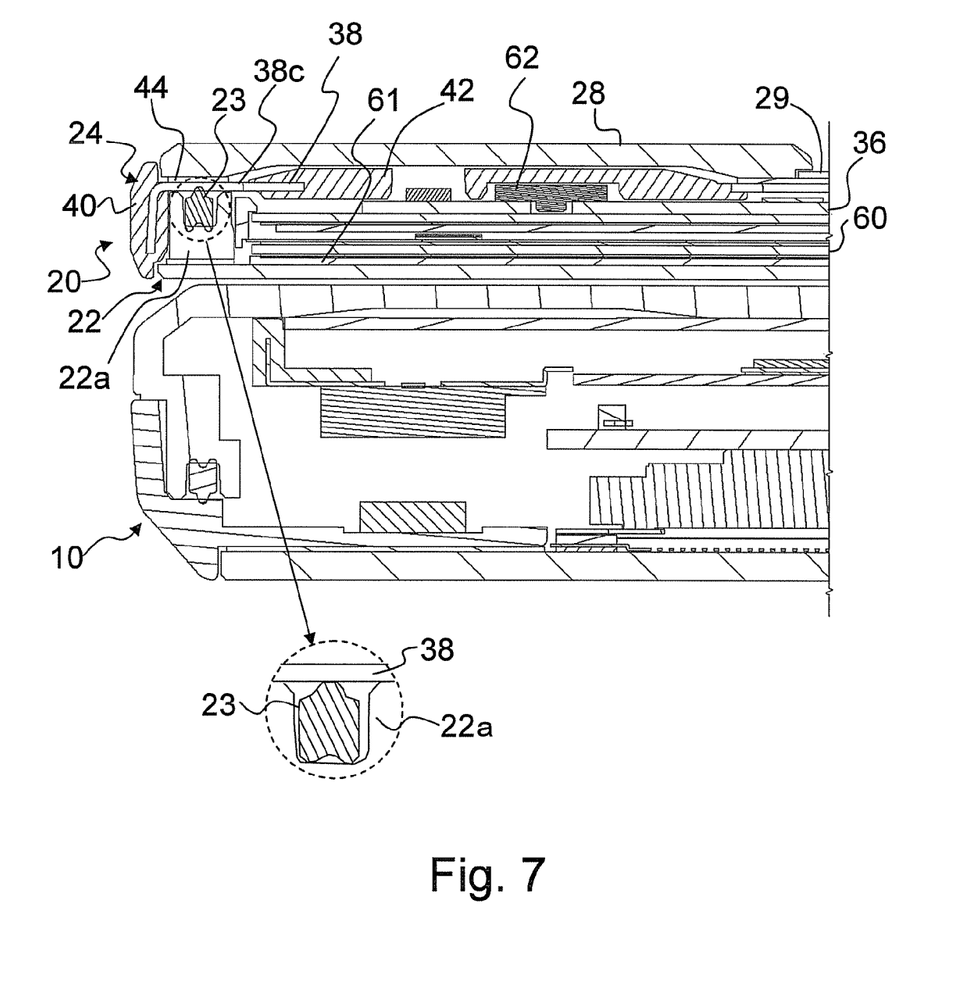
FIG. 7 is a schematic enlarged sectional view taken along line A-A of FIG. 1.

Next, with reference to FIGS. 5 to 7, the internal structure of the cellular phone 1 will be described in detail. FIG. 5 is a plan view of the interior of the movable rear case 24 of the movable housing 20. FIG. 6 is an exploded perspective view of the interior of the movable rear case 24 of the movable housing 20. FIG. 7 is a schematic enlarged sectional view taken along line A-A of FIG. 1.

As illustrated in FIGS. 5 to 7, the movable housing 20 includes the movable front case 22 which is a box-like device housing and the movable rear case 24 which is a box-like device housing assembled and secured to the movable front case 22.

In the movable front case 22, there are provided the liquid crystal display device 60 (see FIG. 7), the sub-LCD module 62 (see FIGS. 6 and 7), and a circuit board 36 (see FIG. 7). On the circuit board 36, there are disposed circuit components for the liquid crystal display device 60 and the sub-LCD module 62 and other electronic components 34 (see FIGS. 6 and 7).

The liquid crystal display device 60 is held by a LCD holder 61 placed upon the bottom surface of the movable front case 22. The liquid crystal display device 60 is disposed at a side of the movable housing 20 so as to face the stationary housing 10 when the cellular phone 1 is folded. The sub-LCD module 62 is held by a sub-LCD holder 63 placed upon the circuit board 36. The sub-LCD module 62 is disposed at a side of the movable housing 20 facing away from the stationary housing 10 when the cellular phone 1 is folded. Hereunder, when considering both the sub-LCD module 62 and the sub-LCD holder 63, they may hereunder be called the "sub-LCD module 62."

A rail-like rib 22a is provided at an inner bottom surface of the movable front case 22 so as to surround the outer periphery of the circuit board 36. Packing 23 is laid along the rib 22a to contact intimately with a metallic plate 38 (described later) of the movable rear case 24 is laid along the rib 22a.

In the movable rear case 24 according to the embodiment, a movable rear case body 43, a waterproof tape 44 (which is a double-faced adhesive tape), an external cover 29, and the rear LCD panel 28 are disposed in that order from the bottom as illustrated in FIG. 6.

The movable rear case body 43 includes the metallic plate 38, an external wall 40, and an electronic component holder 42. The external wall 40 is formed of resin and provided at outer peripheral edges of the metallic plate 38. The electronic component holder 42 is formed of resin and is disposed at the inner area of the metallic plate 38 surrounded by the external wall 40 while being separated from the external wall 40.

The metallic plate 38 is provided for making the rigidity of the entire movable rear case body 43 higher than that of a resin housing alone. The metallic plate 38 is formed of a light metal or alloy having high strength and into a substantially rectangular shape. In the metallic plate 38, openings 38a and an opening 38b are formed in the inner area surrounded by the external wall 40. The openings 38a are provided for exposing to the outside the electronic components 34 mounted on the circuit board 36 of the movable front case 22 and inserted through the openings 38a. The opening 38b is provided for exposing to the outside the sub-LCD module 62 mounted on the circuit board 36 and inserted through the opening 38b.

The external wall 40 is formed by integrating a predetermined resin to the outer peripheral edges of the metallic plate 38. The external wall 40 is fitted onto the outer side of the rib 22a of the movable front case 22, so that the movable rear case body 43 engages the movable front case 22.

The electronic component holder 42 is provided at portions of edges of the opening 38b formed in the inner area of the metallic plate 38 surrounded by the external wall 40. The electronic component holder 42 also holds the sub-LCD module 62 exposed to the outside from the opening 38b while pushing the sub-LCD module 62 towards the circuit board 36 from its upper surface.

Figure 8:
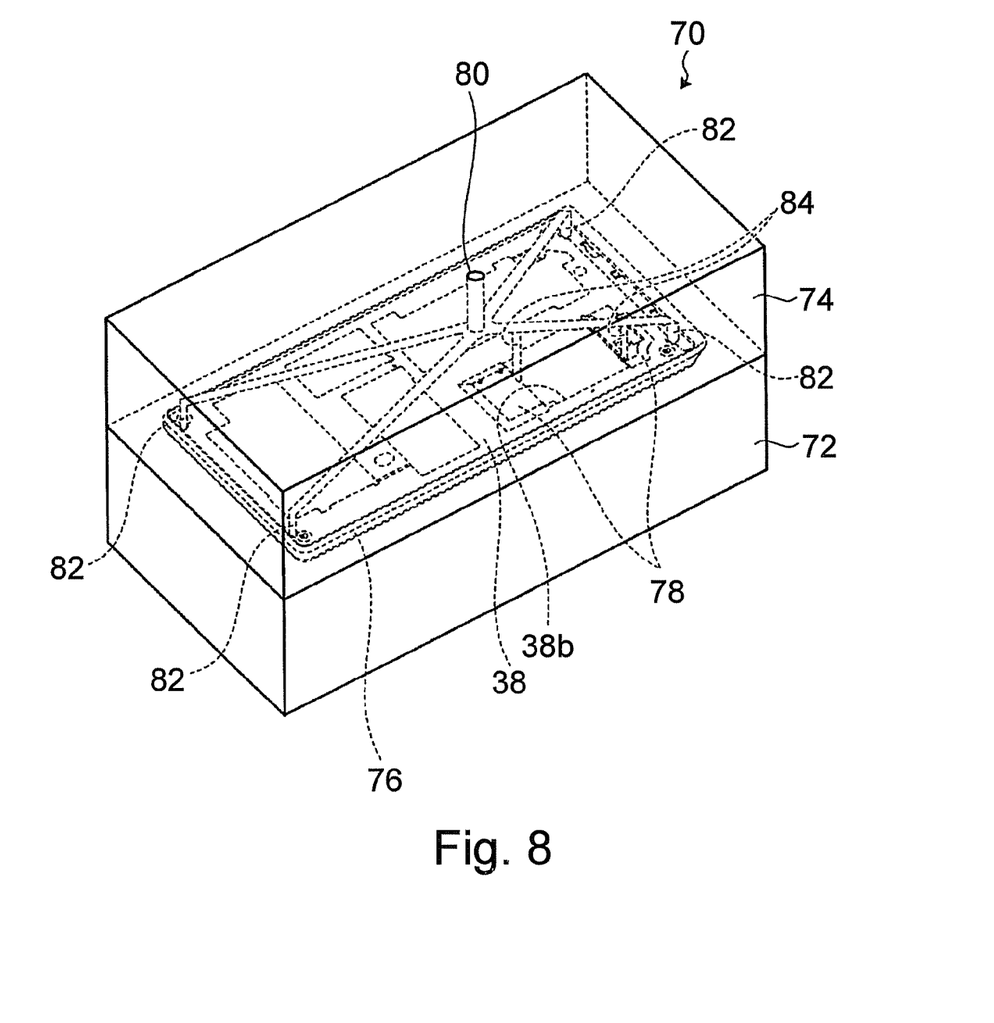
FIG. 8 is a schematic perspective view of a molding die for forming a movable rear case body illustrated in FIG. 7.

The electronic component holder 42 is formed of resin and formed simultaneously with the external wall 40 using a molding die 70 illustrated in FIG. 8. That is, in the movable rear case body 43 according to the embodiment, the electronic component holder 42 and the external wall 40 are simultaneously formed using one molding die 70. By this, since the electronic component holder 42 and the metallic plate 38, where the external wall 40 is formed, are integrally formed with each other, it is possible to use fewer components than in a conventional structure. In the conventional structure, a metallic plate corresponding the metallic plate 38 and a holder corresponding the electronic component holder 42 has been separate components. The formation of the movable rear case body 43 with such a molding die 70 will be described in detail below.

The rear LCD panel 28 is a transparent cover member that covers a display surface of the sub-LCD module 62 exposed from the opening 38b of the metallic plate 38 so as to allow the display surface of the sub-LCD module 62 to be viewed from the outside. The external cover 29 is a cover member serving as a decorative surface that covers from the outer side the electronic components 34 exposed from the openings 38a of the metallic plate 38. Through the waterproof tape 44, the rear LCD panel 28 and the external cover 29 are adhered and secured to an area 38c, situated between the external wall 40 and the electronic component holder 42, in the inner area of the metallic plate 38 surrounded by the external wall 40.

Here, in the inner area of the metallic plate 38 surrounded by the external wall 40, the area 38c, situated between the external wall 40 and the electronic component holder 42, is a metallic surface of the metallic plate 38, and has high flatness. Therefore, by forming the area 38c as an area where the waterproof tape 44 is adhered, it is possible to increase the adhesive strength of the waterproof tape 44 for adhering the external cover 29 and the rear LCD panel 28 to the area 38c. Therefore, the external cover 29 and the rear LCD panel 28 may be reliably adhered to the area 38c. This makes it possible to provide an area located inwardly of the waterproof tape 44 of the metallic plate 38 with sufficient waterproof property, and to prevent sufficiently damage to, for example, the sub-LCD module 62 held by the electronic component holder 42 by overflowing water.

Next, the formation of the movable rear case body 43 will be described. FIG. 8 is a schematic perspective view of the molding die 70 for forming the movable rear case body 43.

As illustrated in FIG. 8, the molding die 70 includes a lower molding die 72 and an upper molding die 74, assembled and secured to the lower molding die 72 while the metallic plate 38 is interposed between the upper molding die 74 and the lower molding die 72. Two cavities are separately formed from each other in the molding die 70 when the lower and the upper molding dies 72 and 74 are assembled. One cavity is an external-wall cavity 76 for forming the external wall 40 and the other cavity is an electronic-component-holder cavity 78 for forming the electronic holder 42. That is, the external-wall cavity 76 has a space in correspondence with the shape of the external wall 40, and the electronic-component-holder cavity 78 in correspondence with the shape of the electronic holder 42.

The upper molding die 74 includes an injection port 80, used for injecting resin into the upper molding die 74, a first resin gate 82, connected to the injection port 80 through a predetermined flow path, and a second resin gate 84, similarly connected to the injection port 80 through a predetermined flow path.

The first resin gate 82 is a discharge port for discharging resin for forming the external wall 40. The first resin gate 82 is connected to the external-wall cavity 76, so that resin injected into the injection port 80 is introduced to the external-wall cavity 76 for filling the cavity 76.

The second resin gate 84 is a discharge port for discharging resin for forming the electronic component holder 42. The second resin gate 84 is connected to the electronic-component holder cavity 78, so that resin injected into the injection port 80 is introduced to the electronic-component holder cavity 78 for filling the electronic-component holder cavity 78.

The movable rear case body 43 is formed using the molding die 70 having the above-described structure. First, the metallic plate 38 is placed on the lower molding die 72, and the lower molding die 72 and the upper molding die 74 are assembled to each other to interpose the metallic plate 38 between the lower molding die 72 and the upper molding die 74. At this time, the external-wall cavity 76 is positioned along the outer peripheral edges of the metallic plate 38, and the electronic-component holder cavity 78 separated from the external-wall cavity 76 is disposed at portions of edges of the opening 38b of the metallic plate 38.

Next, resin is injected into the injection port 80. The resin injected from the injection port 80 flows through the predetermined flow path and reaches the first resin gate 82. Then, the resin fills the external-wall cavity 76 through the first resin gate 82. Thereafter, the resin with which the external-wall cavity 76 is filled is solidified, so that the external wall 40 is formed at the outer peripheral edges of the metallic plate 38.

At the same time, the resin injected from the injection port 80 flows through the predetermined flow path and reaches the second resin gate 84. The resin fills the electronic-component holder cavity 78 through the second resin gate 84. Then, the resin with which the electronic-component holder cavity 78 is filled is solidified, so that the electronic component holder 42 is formed at portions of edges of the opening 38b of the metallic plate 38.

In this way, using the molding die 70 in which the second resin gate 84 differing from the first resin gate 82 is disposed, the electronic component holder 42 is formed simultaneously with the external wall 40 with the resin discharged from the second resin gate 84. As a result, molding the movable rear case body 43 illustrated in FIG. 6 is finished.

In the movable rear case body 43 formed using the molding die 70 in this way, the electronic component holder 42 is disposed while being separated from the external wall 40. Therefore, in the inner area of the metallic plate 38 surrounded by the external wall 40, the area 38c situated between the external wall 40 and the electronic component holder 42 and having high flatness may be provided. Therefore, by forming the area 38c as an area where the waterproof tape member is adhered, it is possible to increase the adhesive strength of the waterproof tape 44 for adhering the external cover 29 and the rear LCD panel 28 to the area 38c. Consequently, the external cover 29 and the rear LCD panel 28 may be sufficiently adhered to the area 38c. This makes it possible to provide an area located inwardly of the waterproof tape 44 of the metallic plate 38 with sufficient waterproof property, and to prevent reliably damage to, for example, the sub-LCD module 62, held by the electronic component holder 42, by overflowing water.

The electronic component holder 42 made of resin is formed simultaneously with the external wall 40 using the molding die 70, where these components are disposed in the removable rear case 43. That is, the electric component holder 42 is integrally formed with the metallic plate 38 where the external wall 40 is formed. Therefore, it is no longer necessary to attach the electronic component holder 42 as a different component to the metallic plate 38 later, and the number of components and the number of mounting steps may be reduced.

As described above, the movable rear case 24 (or movable rear case body 43) of the cellular phone 1 according to the embodiment includes the metallic plate 38, the resin external wall 40, and the electronic component holder 42. The external wall is formed at the outer peripheral edges of the metallic plate 38. Using the molding die 70 in which the second resin gate 84 differing from the first resin gate 82 serving as an ejection port for resin used to form the external wall 40 is disposed, and using resin discharged from the second resin gate 84, the electronic component holder 42 is simultaneously formed with the external wall 40. In addition, the external component holder 42 is disposed at the inner area of the metallic plate 38 surrounded by the external wall 40 (that is, portions of edges of the opening 38a) while the electronic component holder 42 is separated from the external wall 40. Therefore, since the electronic component holder 42 and the metallic plate 38, where the external wall 40 is formed, are integrally formed with each other, it is possible to use fewer components than in a conventional structure. The conventional structure has used a metallic plate and an electronic component holder which are individually made. As a result, the structure according to the present embodiment may reduce costs due to a reduction in the number of components and processing steps, while providing waterproof property.

Other Embodiments

Although embodiments of the present invention have been described above, the present invention may be carried out on the basis of various embodiments other than those described above.

For example, in the above-described embodiments, the electronic component holder 42 is described as being formed so as to hold the sub-LCD module 62 mounted on the circuit board 36 in the movable front case 22. However the present invention is not limited thereto. Accordingly, the electronic component holder 42 may be formed so as to hold the other electronic components 34 mounted on the circuit board 36 in the movable front case 22. Even in this case, the electronic component holder 42 is simultaneously formed with the external wall 40, where the electronic component holder 42 is formed of resin discharged from the second resin gate 84 of the molding die 70. The second resin gate 84 also differs from the first resin gate 82 serving as an ejection port for resin used to form the external wall 40. In addition, the external component holder 42 is disposed at the inner area of the metallic plate 38 surrounded by the external wall 40 while the electronic component holder 42 is separated from the external wall 40.

In the above-described embodiment, an exemplary application to a cellular phone of the type that is folded by a hinge structure is described. However the present invention is applicable to a cellular phone including not only the illustrated hinge structure but also various other hinge structures. Further, the present invention is similarly applicable, not only to the type that is folded by a hinge structure, but also to a type in which the movable housing is freely superposed upon the stationary housing by a sliding or a in-plane rotating linking structure.

Although, in the above-described embodiment, an exemplary application to a cellular phone is described as a mobile terminal device, the present invention is not limited thereto. The present invention is applicable to various other mobile terminal devices, such as a portable game machine, a portable TV, a small music playback device, and a small information processing terminal such as a personal digital assistant (PDA).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A device housing for a mobile terminal device, the device housing comprising:
    a metallic plate of the mobile terminal device;
    an external wall formed of resin to be secured to an outer peripheral edge of the metallic plate;
    an electronic component holder formed of the resin to be secured on an inner area of the metallic plate surrounded by the external wall and disposed apart from the external wall so that a portion of the metallic plate is between the electronic component holder and the external wall, wherein the external wall and the electronic component are both integrally formed with the metallic plate;
    a waterproof double faced adhesive tape disposed on said portion of the metallic plate; and
    a panel member secured on the metallic plate through the waterproof double face adhesive tape, and disposed over an electronic component held by the electronic component holder.

2. The device housing according to claim 1, wherein each of the external wall and the electronic component holder are formed of the resin introduced through individual injection ports, respectively, of a molding die.

3. A mobile terminal device comprising:
    a device housing of the mobile terminal device, the device housing including:
        a metallic plate;
        an external wall formed of resin to be secured at an outer peripheral edge of the metallic plate; and
        an electronic component holder formed of the resin to be secured on an inner area of the metallic plate surrounded by the external wall, the electronic component holder being disposed apart from the external wall so that a portion of the metallic plate is between the electronic component holder and the external wall, wherein the external wall and the electronic component are both integrally formed with the metallic plate;
    a waterproof double faced adhesive tape disposed on said portion of the metallic plate; and
    a panel member secured on the metallic plate through the waterproof double face adhesive tape, and disposed over an electronic component held by the electronic component holder.

4. The mobile terminal device according to claim 3, wherein each of the external wall and the electronic component holder are formed of the resin introduced through individual injection ports, respectively, of a molding die.

5. A method for forming a device housing for a mobile terminal device, the method comprising:
    preparing a molding die in which a metallic plate is set, and
    molding resin into cavities of the molding die, the cavities being formed in accordance with forms of an external wall and an electronic component holder, the external wall being formed at outer peripheral edges of the metallic plate, the electronic component holder being formed at an inner area of the metallic plate surrounded by the external wall, the electronic component holder being disposed apart from the external wall so that a portion of the metallic plate is between the electronic component holder and the external wall, the external wall and the electronic component are both thereby integrally formed with the metallic plate;
    disposing a waterproof double faced adhesive tape on said portion of the metallic plate, and
    providing a panel member secured on the metallic plate through the waterproof double faced adhesive tape, and disposed over an electronic component held by the electronic component holder.

6. The method according to claim 5, wherein each of the external wall and the electronic component holder are molded of the resin introduced through individual injection port of the molding die.

* * * * *

UNITED STATES PATENT AND TRADEMARK OFFICE
CERTIFICATE OF CORRECTION

| | | |
|---|---|---|
| PATENT NO. | : 8,718,723 B2 | Page 1 of 1 |
| APPLICATION NO. | : 12/609351 | |
| DATED | : May 6, 2014 | |
| INVENTOR(S) | : Suzuki et al. | |

It is certified that error appears in the above-identified patent and that said Letters Patent is hereby corrected as shown below:

In the Claims

Column 8, Line 30, in Claim 5, delete "set, and" and insert -- set, --, therefor.

Signed and Sealed this
Thirtieth Day of September, 2014

Michelle K. Lee
*Deputy Director of the United States Patent and Trademark Office*